(12) United States Patent
Porter

(10) Patent No.: US 6,580,791 B1
(45) Date of Patent: Jun. 17, 2003

(54) APPARATUS FOR PROVIDING DATA TO SWITCHING ELEMENTS IN A COMMUNICATIONS SYSTEM

(75) Inventor: Kelvin Porter, Dallas, TX (US)

(73) Assignee: Worldcom, Inc., Clinton, MS (US)

( * ) Notice: Subject to any disclaimer, the term of this patent is extended or adjusted under 35 U.S.C. 154(b) by 0 days.

(21) Appl. No.: 09/397,579

(22) Filed: Sep. 16, 1999

(51) Int. Cl.[7] .................................................. H04M 7/00

(52) U.S. Cl. ................................ 379/220.01; 379/219

(58) Field of Search ........................... 379/220.01, 219, 379/221.01, 229, 230, 207.02, 242

(56) References Cited

U.S. PATENT DOCUMENTS 5,978,464 A * 11/1999 Sonnenberg ........... 379/220.01

* cited by examiner

Primary Examiner—Benny Q. Tieu (57) ABSTRACT

A method and apparatus in a switching element for maintaining data used in operation of a communications system. Examples of such operations include serving sessions and routing calls. A local data structure is maintained within the switching element wherein the local data structure contains data used by the switching element in its operation in the communications system. Responsive to a requirement for needed data that is unavailable or out-of-date from the local data structure, a request is generated for the needed data from a server through a communications link from the switching element to the server.

5 Claims, 8 Drawing Sheets

| NODE DATA | | |
|---|---|---|
| Logical Resource | | Physical Resource |
| Node Name | Logical Name | (Switch Specific Data) |
| Node 1 | Trunk Number 1 | <data for trunk member1> |
| Node 2 | Trunk Number 2 | <data for trunk member2> |
| ... | ... | ... |

FIG. 4

| NODE SHARED DATA | | | |
|---|---|---|---|
| Originating Resource | | Terminating Resource | |
| Node Name | Logical Name | Node Name | Logical Name |
| Node 1 | Trunk Member 1 | Node 2 | Trunk Member 1 |
| ... | ... | ... | ... |
| Node 2 | Trunk Member 500 | Node 6 | Trunk Member 500 |
| ... | ... | ... | ... |

FIG. 5

| NETWORK DATA | | |
|---|---|---|
| Originating Node | Destination Node | (Alternative Nodes sorted by Preference) |
| 1 | 2 | 5,3,6,7... |
| 1 | 3 | 5,2,7,6... |
| ... | ... | ... |
| ... | ... | ... |

APPARATUS FOR PROVIDING DATA TO SWITCHING ELEMENTS IN A COMMUNICATIONS SYSTEM

BACKGROUND

The present invention relates generally to an improved telecommunications system and in particular to a method and apparatus for maintaining data, such as routing tables and software, used by network elements in a telecommunications network.

A communications network serves to transport information among a number of locations. The information to be transported is usually presented to the network in the form of time-domain electrical signals and may represent any combination of telephony, video, or computer data in a variety of formats. To transport such information, a typical communications network includes various physical sites, or "nodes," and information conduits, called "links," that interconnect the nodes. Each link serves to carry information from one node to another node. Links are often implemented as electric cables, optical fibers, or radio paths. Each node typically contains some means for switching a stream of incoming data from one link onto one of many outgoing links. Nodes can thereby perform routing of information through the network via the associated links.

Various equipment, referred to as "network elements", are placed at nodes along links for combining, separating, transforming, conditioning, and routing information signals. A "switching element" is a type of network element that causes information to follow a particular path through the network. The setting up of a path from a source node to a destination node is typically accomplished by switching elements within the network nodes. The behavior of each switching element is determined by software instructions and data tables accessed by a data processor controlling the switching element.

To ensure proper operation of the network, and particularly cooperation of nodes in performing routing of information, all switching elements in the network must have correct software instructions and data tables. Likewise, other types of network elements often use software and data tables to control their respective functions. Maintaining consistent operating information among all network elements is necessary for proper network operation but is a difficult task. In a large network, both data tables and software loads are often large and cumbersome to maintain. Furthermore, updates of switching data tables used by switching elements are frequently necessary due to constant changes in the topology of, and provisioning within, the network.

Network engineers keep a master table representing the interconnections among the switching elements in the nodes of a network. To perform routing of information through the network, each switching element must have access to some or all of the information in the master table. One way of providing this access is to have all switching elements consult a centralized table. A centralized table can be readily changed by network engineers to reflect the most up to date information about connectivity within the telecommunications network. A drawback with this type of system is that each node within the telecommunications network must constantly access the centralized table. This constant need for access to a centralized table leads to performance bottlenecks. Moreover, if the centralized table is rendered unavailable, then the entire network can be disabled.

The alternative approach of using distributed tables avoids some of the foregoing problems but introduces new problems as well. The main problem with using distributed tables is the difficulty in maintaining synchronization among table contents if, for example, a copy of the master table is replicated at each switching element. A mismatch in the table contents among various nodes in the telecommunications network may cause traffic to be mishandled and lost. This implies that changes to table contents must be made simultaneously through the network. In practice, the network cannot be disabled for any length of time to allow for contents of all tables to be updated. Furthermore, keeping a copy of the master table at each switch can be unwieldy because of the size of the table.

On the other hand, keeping more locally pertinent subsets of the master table complicates the process of managing customized contents of the table at each switching element.

Therefore, what is needed is an improved method and apparatus for maintaining operating information among network elements, such as routing information among switching elements, in a communications network.

SUMMARY

The present invention provides a method and an apparatus in a communications system for maintaining data and software used in operating network elements within the communications system. As the need arises, data required by a network element is obtained from a network-wide data repository function that can provide the data. This need for the network element to obtain data from the data repository function may arise, for example, due to changes in network topology, operational status of the network, or availability of new information within the data repository function. For example, the network-wide data repository functions may dispense portions of a master routing table or revised software loads for the network elements. In a preferred embodiment, the network elements may selectively request subsets of the data contained in the network-wide data repository function and store the retrieved information locally for subsequent use by the network element.

DETAILED DESCRIPTION

Figure 1:
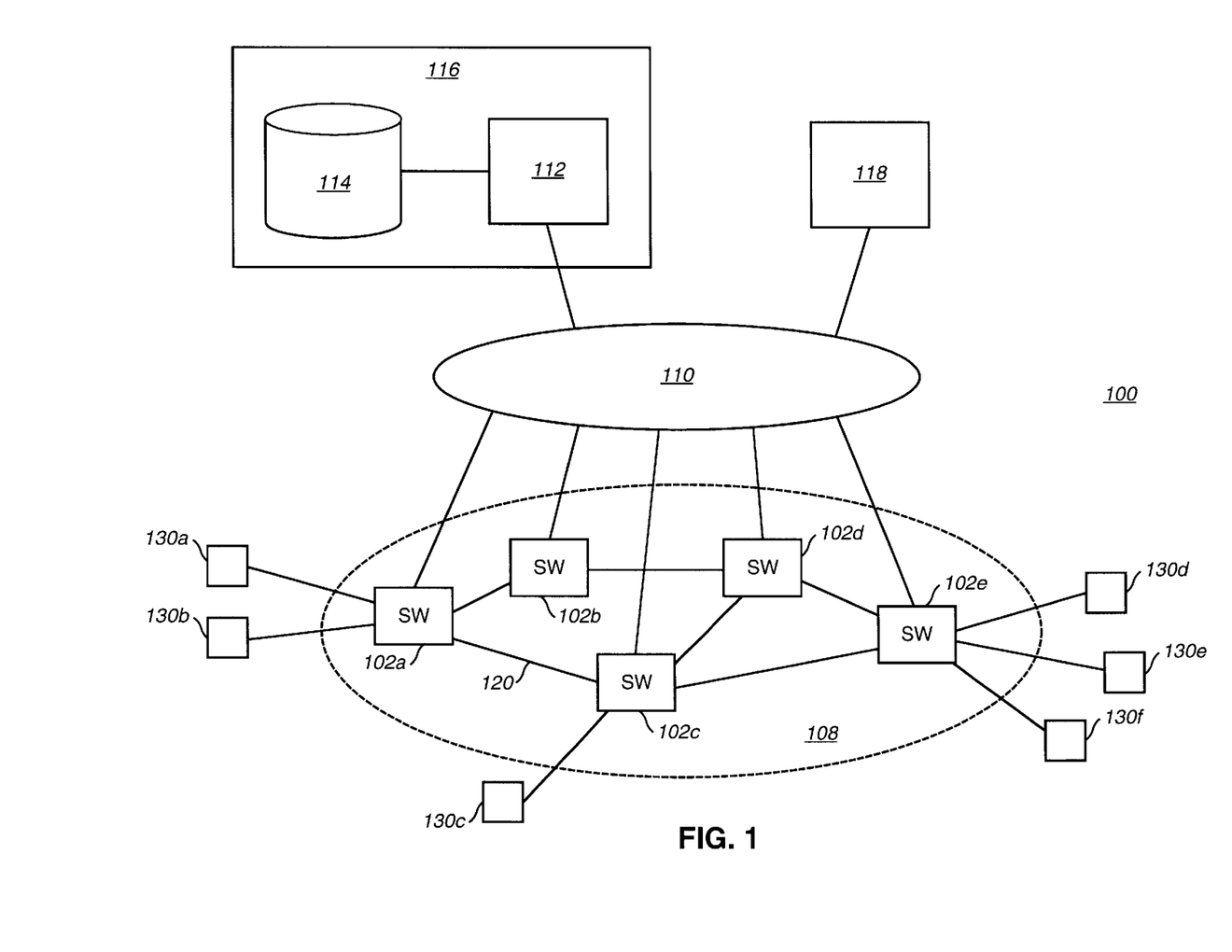
FIG. 1 is a block diagram of a communications system in which the present invention may be implemented.

With reference now to the figures, FIG. 1 is a block diagram of a communications system 100. Communications system 100 includes traffic-bearing telecommunications network 108. The telecommunications network 108 comprises switching elements 102a, 102b, 102c, 102d, and 102e interconnected by links, such as link 120, and other network elements and communications links (not shown). The telecommunications network 108 serves to carry information among a number of locations, represented by customer premise equipment (CPE) sites 130a–130f. Each CPE site may include, for example, analog or digital telephones, PBX's, data terminals, computer workstations, computer servers, mainframe computers, video facilities, and the like. A commercial telecommunications network often comprises hundreds of switching elements and serves thousands, or even millions, of users.

The switching elements 102a–102f are also connected to a data network 110. The data network 110 provides the medium through which the switching elements 102a–102f may send information, such as operational status information, to a network management system (NMS) 118. The data network 110 may also carry control commands and other data from the NMS 118 to the switching elements 102a–102f. A network data repository function 116 is connected to the data network 110 and is shown to comprise a network data server 112 and a network data repository 114. The network data repository 114 is a storage facility containing all data required to run a network, such as traffic routing tables, synchronization plans, restoral plans, and operating software needed by the network elements in the telecommunications network 108. The network data server 112 is a processor that controls the dissemination of data from the network data repository 114 to the network elements in the telecommunications network 108. The network data repository function 116 may comprise numerous instances each of the network data repository 114 and the network data server 112 and may be implemented in a distributed fashion. The network repository 114 and the network data server 112 need not be physically co-located. To improve performance and robustness, multiple network data servers 112 may be employed, each connecting to one or more network data repository 114. Furthermore, the network data repository function 116 may be integrated as a function within the NMS 118.

Disclosed herein is a method by which each network element in a network has ready access to current operational data derived from the contents of a centralized network data repository. In the system 100, access to operational data in the network data repository 114 information is provided to the switching elements 102a–102e by the network data server 112 across the data network 110.

Each network element maintains a local data storage for operational data needed by the network element. For example, each switching element in a network maintains a local data storage that is a replica or subset of the centralized master routing table. The information used to route or switch calls can be stored in a table or other data structures, such as a relational database or the like.

As information is needed by a network element, for example by a switching element needing to route a call, the network element consults the local data storage for the required information. If during the processing of a call a switching element requires information not located in the local table, then the switching element requests the information from the centralized table and then stores the retrieved information in the local table. In this manner, each switching element tends to accumulate information that it uses most often. As a result, a customized table is automatically created for each switching element. In addition, the centralized table tracks which switching elements have requested each piece of data or record on the master table. This information is used to notify each switching element upon a change to the data that was requested by those switching elements.

Figure 2:
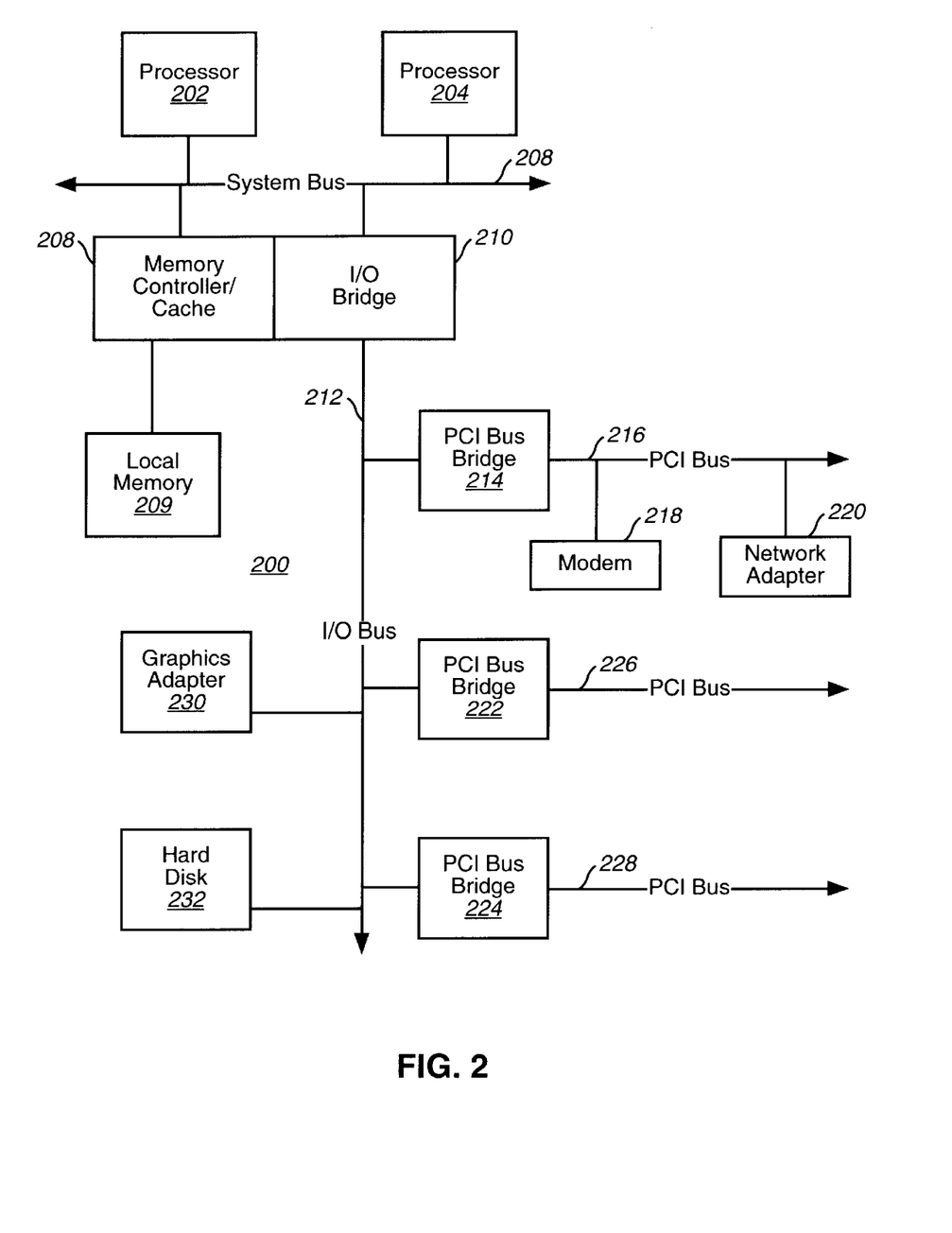
FIG. 2 is a block diagram depicts a data processing system, which may be implemented as a network data server.

Referring to FIG. 2, a block diagram depicts a data processing system, which may be implemented as a network data server, such as network data server 112 in FIG. 1. FIG. 2 is an example of a server that may be used to provide and maintain switching information within communications system 100 of FIG. 1. A data processing system 200 may be a symmetric multiprocessor (SMP) system including a plurality of processors 202 and 204 connected to a system bus 206. Alternatively, a single processor system may be employed. Also connected to the system bus 206 is a memory controller/cache 208, which provides an interface to a local memory 209. An I/O bus bridge 210 is connected to the system bus 206 and provides an interface to an I/O bus 212. The memory controller/cache 208 and the I/O bus bridge 210 may be integrated as depicted.

A peripheral component interconnect (PCI) bus bridge 214 connected to the I/O bus 212 provides an interface to a PCI local bus 216. A number of modems 218–220 may be connected to the PCI bus 216. Typical PCI bus implementations will support four PCI expansion slots or add-in connectors. Communication links to switching elements 102a–102e in FIG. 1 may be provided through the modem 218 and the network adapter 220 connected to the PCI local bus 216 through add-in boards.

Additional PCI bus bridges 222 and 224 provide interfaces for additional PCI buses 226 and 228, respectively, from which additional modems or network adapters may be supported. In this manner, the system 200 allows connections to multiple network computers. A memory-mapped graphics adapter 230 and a hard disk 232 may also be connected to the I/O bus 212 as shown, either directly or indirectly. In the illustrative example, the network data repository 114 from FIG. 1 may be stored within the hard disk 232.

Those of ordinary skill in the art will appreciate that the hardware depicted in FIG. 2 may vary. For example, other peripheral devices, such as an optical disk drive or the like, also may be used in addition to or in place of the hardware depicted. The depicted example is not meant to imply architectural limitations with respect to the present invention.

Figure 3:
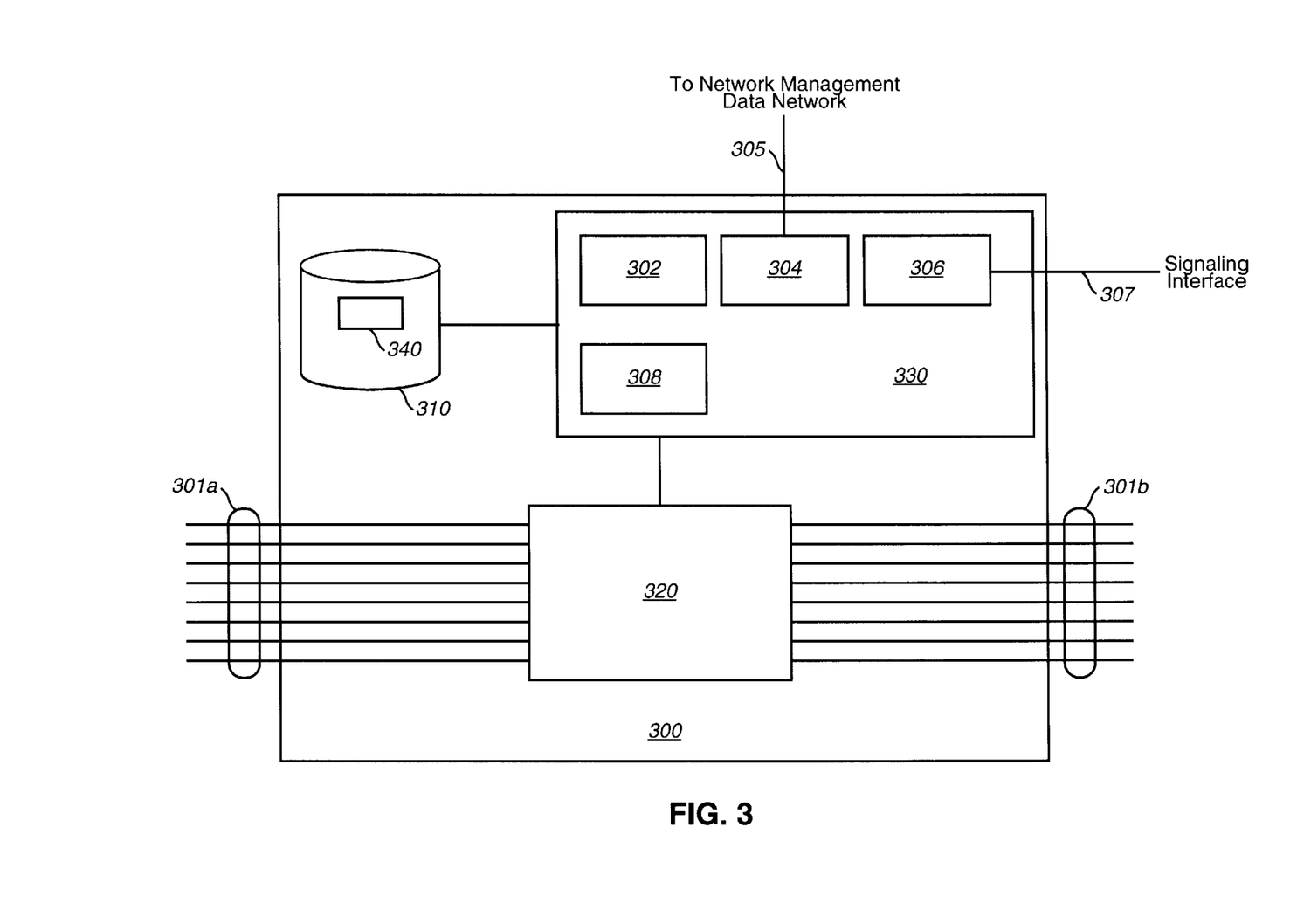
FIG. 3 is a functional block diagram of a switching element.

With reference now to FIG. 3, a switching element 30 includes a switch matrix 320 for routing information traffic between bearer channel connections 301a and 301b, which that are generally connected to other switching elements in the network 100. The switching element 300 also includes a switch controller 330, which is a data processor used to control the switch matrix 320. The switch controller 330 is coupled to a local data storage 310, which may be included in switching element 300. Alternatively, the local data storage 310 may be physically separate from, but accessible to, the switching element 300 through the switch controller 330. The local data storage 310 may be implemented in various forms, such as random access memory (RAM), non-volatile memory, or a storage device such as a hard drive or optical disk drive.

One or more local data items, such as a local table 340, are stored within the local data storage 310. In the case of example, the switching element 300, the local data table 340 may be a replica or subset of the master table for the entire network.

The switch controller 330 is shown in FIG. 3 to host several different processes. A control link process 304 coordinates communications with a network management system over a control link 305. A signaling interface process 306 permits the switching element 300 to participate as an element in a common-channel signaling environment, such as the public switched telephone network. As is well understood among those of skill in the art, the switch controller 330 typically hosts many other processes related to handling of calls and routing of traffic through the switch.

The switch controller 330 further comprises a local data content manager 302 as a process. The local data content manager 302 oversees the creation and maintenance of local data, such as a local data table 340, within the local data storage 310. The local data content manager 302 determines when to obtain data from a centralized source and when to discard data from the local data storage. The local data content manager 302 communicates to a remote data server through the control link process 304.

The local data content manager 302 can manage the data items in the local data storage 310 in response to several conditions.

In the event that a call handling process 308 needs information that is not already present in the local data storage 310, the local data content manager 302 initiates a request to retrieve the required information from a remote repository, such as NDRF 116, and stores the retrieved information in the local data storage 310 for subsequent use by the switching element 300.

In one embodiment, each data item stored in the local data storage 310 is associated with a version number or time stamp attribute. When the local data content manager 302 detects, or is notified, that a newer version of a data item is available in a central repository, then the local data content manager 302 may initiate a request to obtain the newer version of the data item from the central repository and overwrite the older version of the data item within the local data storage 310.

In another embodiment, each data item has an associated time of expiration. The local data content manager 302 monitors the expiration time for each data item and removes items that have expired.

The local data content manager 302 may also respond to instructions from a centralized repository to accept and store, data items in local storage, even if a need for the data has not been experienced by the switching element 300 nor recognized by the local data content manager 302.

Figure 4:
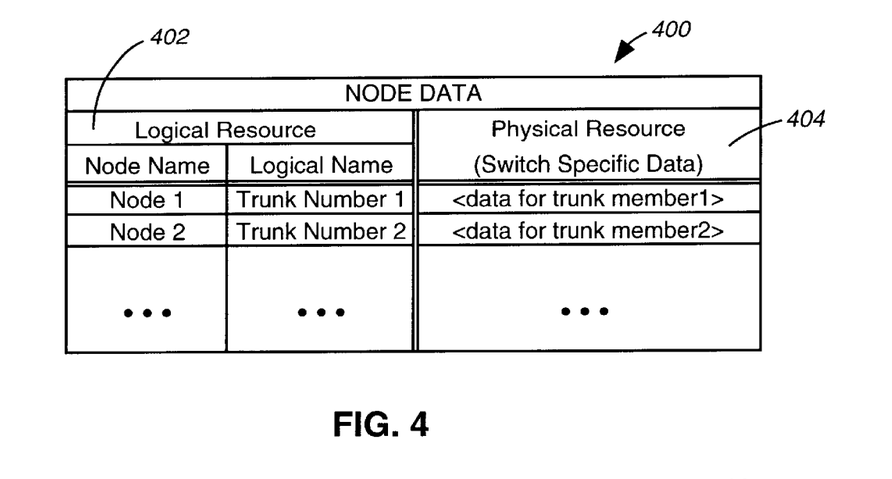
FIG. 4 is an example of data stored in a table for use in routing calls related to intra-nodal data used by only one node.
Figure 5:
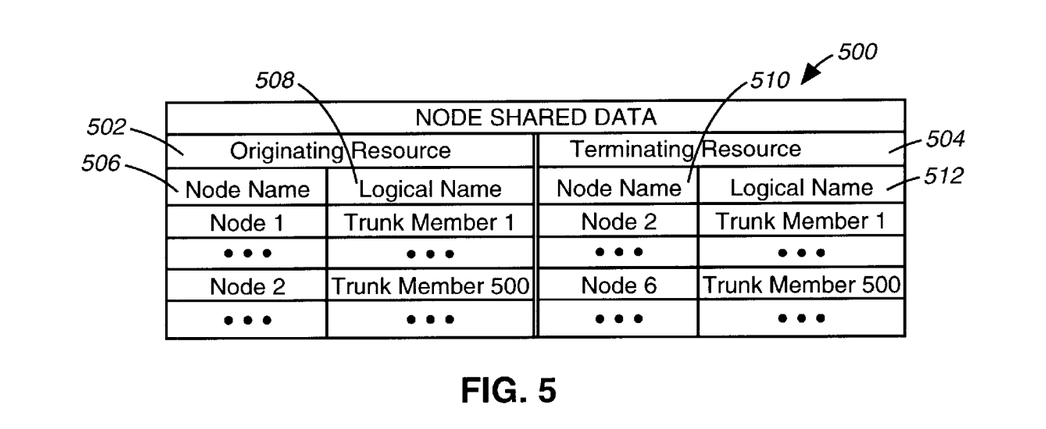
FIG. 5 is a table illustrating information used to route calls related to intra-nodal data shared between two nodes.

With reference to FIGS. 4 and 5, examples of local tables stored within a switching element are depicted. Turning now to FIG. 4, table 400 contains switch resource names and is an example of a table that may be stored within the local data storage 310 in the switching element 300 of FIG. 3. Each entry in table 400 includes a logical name and a physical resource identification. A logical name 402 is the name given to the resource while a physical resource identification 404 contains the switch specific information associated with logical name 402. This switch specific information includes, for example, equipment identifiers, card identifiers, and protocols.

Turning next to FIG. 5, table 500 includes information used to route calls and contains information regarding network node connections and may be stored within the local data storage 310 in switching element 300 of FIG. 3. Table 500 includes an origination resource section 502 and a terminating resource section 504. Each entry in origination resource section 502 includes a node 506 and a logical name 508. Similarly, each entry in the terminating resource section 504 includes a node name 510 and a logical name 512.

Figure 6:
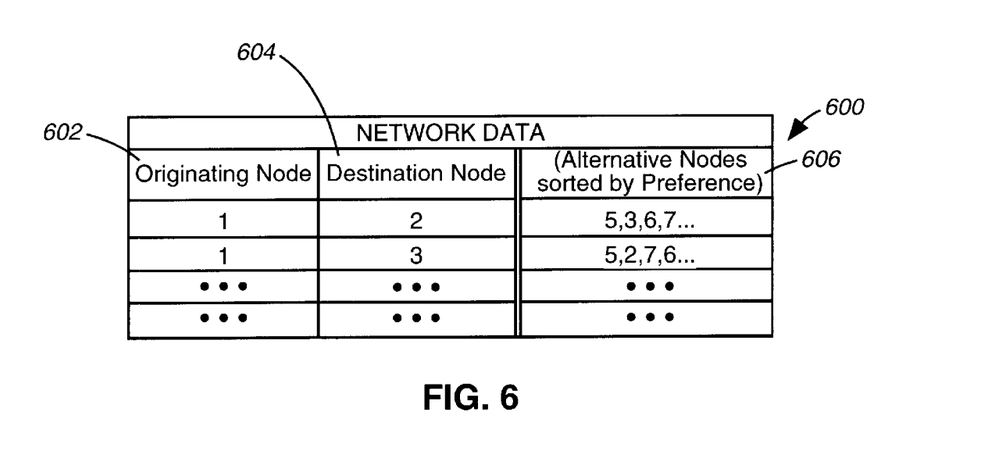
FIG. 6 is a table illustrating information used to route calls related to network data wherein some of all data may be required by every node.

Turning now to FIG. 6, table 600 includes an originating node section 602, a destination node section 604, and an alternative node section 606. This table is used to identify ports that may be used to route a call in response to receiving a call at a node. Based on the originating node and the destination node, a preference of a particular node may be identified in the sorted preference 606.

Figure 7:
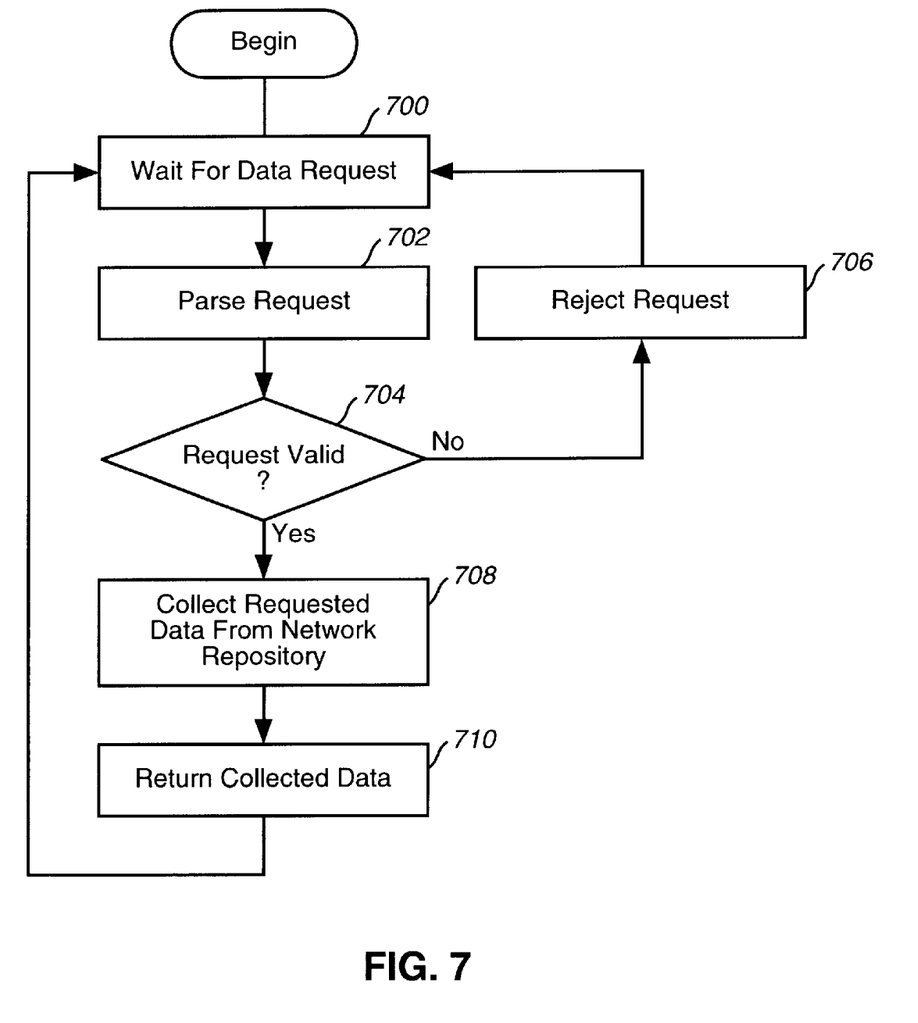
FIG. 7 is a flowchart of a process for servicing data requests.

With reference now to FIG. 7, a flowchart of a process for servicing data requests is depicted. The processes described with reference to FIG. 7 are those processes employed in a network data server, such as the network data server 112 of FIG. 1. The process begins by waiting for a data request from a switching element at step 700. Upon receiving a data request, the request is parsed at step 702. At step 704, determination is made as to whether the request is valid. This determination may be made in a number of ways. For example, if the table is unknown or if the key (index) is out of range, the request is considered invalid. Alternatively, the data could be "out of date" or unavailable resulting in invalid data. If the request is invalid, then at step 706, the request is rejected and the process returns to step 700. The rejection of an invalid request may involve a discarding of the request or may include returning a response to the switching element originating the request, thereby indicating that the request is invalid.

If the request is valid, then at step 708, the requested data is collected from a network repository, such as the network data repository 114 in FIG. 1. In step 708, the collection of the requested data may result in all of the requested data being found in the network repository or only portions of the data requested being found. If only portions of the data are found, only those portions collected from the network data repository 114 are returned to the requesting switch element. At step 710, the collected data is returned to the switching element requesting the data with the process then returning to step 700 to wait for another data request.

Figure 8:
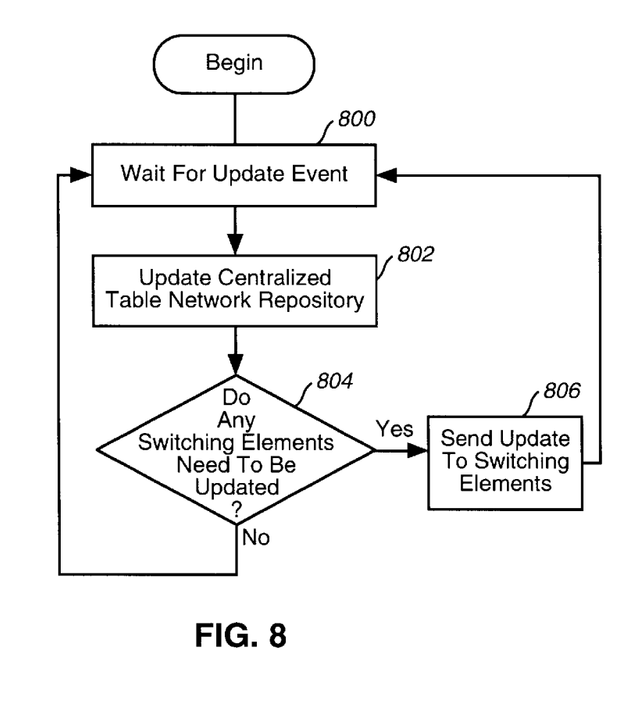
FIG. 8 is a flowchart of a process for servicing update events.

With reference now to FIG. 8, a flowchart of a process for servicing update events is depicted. This process is employed by the network data server 112 to provide updated information to various switching elements. At step 800, the process begins by waiting for an update event. At step 802, upon the occurrence of an update event, the centralized table in the network data repository 114 is updated. An update event may include a number of different events occurring within the communications network. For example, an update event may be the addition of a new switching element or the identification of a switching element that has been removed or has failed. In addition, an update event may include new provisioning data that sets up specific paths for various types of calls.

After the centralized table in the network repository has been updated, at step 804, a determination is made as to whether any of the switching elements need to be updated.

If any of the switching elements are to be updated, then at step 806, the update is sent to the switching elements identified as needing updates with the process then returning to step 800. Otherwise, the process returns to step 800 without sending an update.

Figure 9:
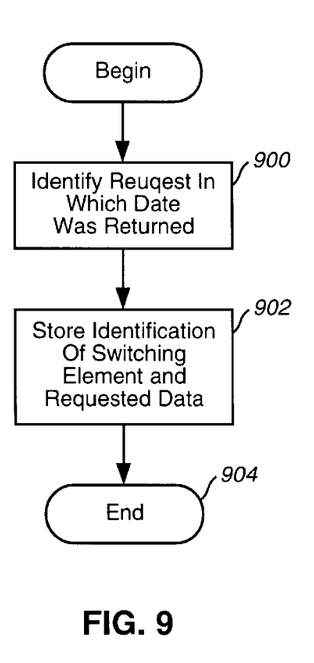
FIG. 9 is a flowchart of a process for identifying and recording switching elements requesting data.

With reference now to FIG. 9, a flowchart of a process for identifying and recording switching elements requesting data is depicted. The process illustrated in FIG. 9 is used by a network data server, such as the network data server 112 in FIG. 1 to identify switching elements 102 requesting data, such that the switching elements 102 may be notified of updates upon changes to data sent to any switching element. At step 900, the process identifies a request from the switching element 102 in which data has been returned to the switching element 102 in response to the request. At step 902, an identification of the switching element 102 and the returned data is stored in an update database with the process terminating at step 904.

Figure 10:
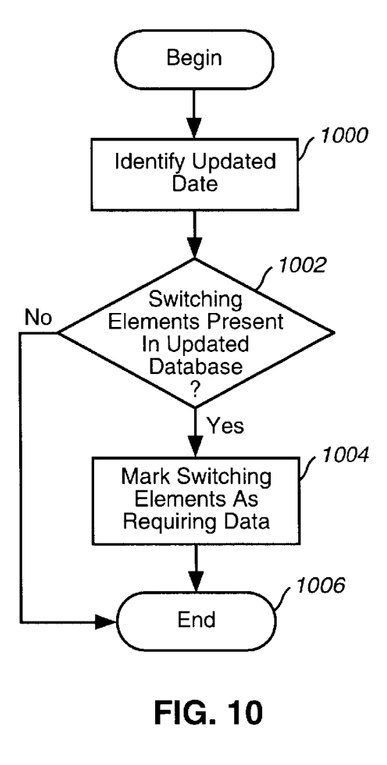
FIG. 10 is a flowchart of a process for identifying whether switching elements are present that need updated information.

With reference now to FIG. 10, a flowchart of a process for identifying whether the switching elements 102 are present that need updated information is depicted. This process is employed by a network data server to identify the switching elements 102, which require updates when changes have occurred in a centralized table. This flowchart is a more detailed description of step 804 in FIG. 8. At step 1000, the process begins by identifying data in the network data repository 114 that has been updated. At step 1002, a determination is made as to whether any switching elements are present in an update database for the data that has been updated in the centralized table network repository. If switching elements are present, at step 1004, then the switching elements are identified as switching elements requiring updates. Otherwise, the process terminates at step 1006.

Figure 11:
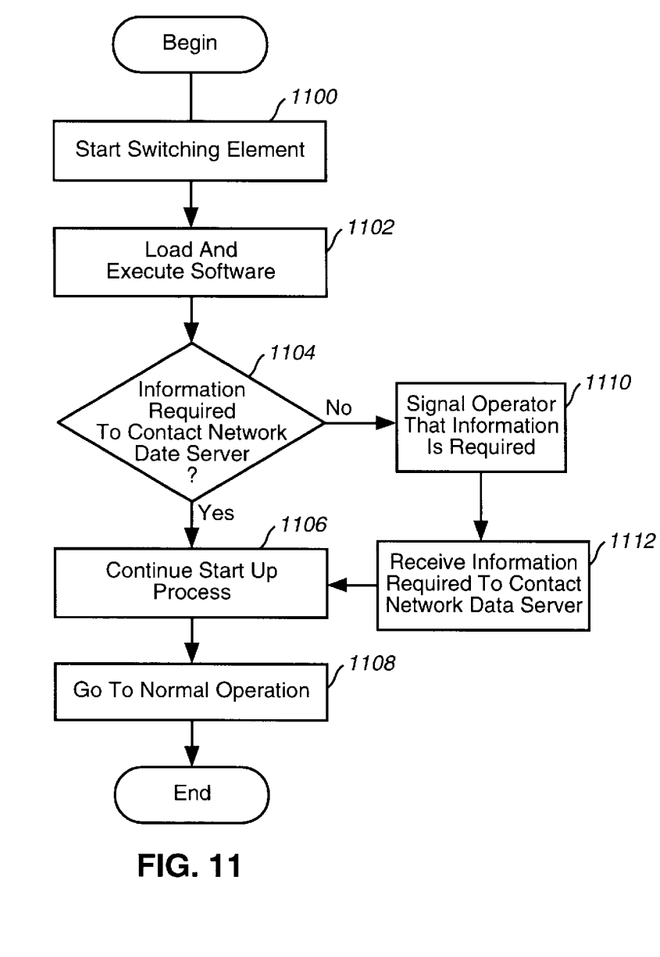
FIG. 11 is a flowchart of a process for starting up a switching element.

With reference now to FIG. 11, a flowchart of a process for starting up the switching element 102 is depicted. This flowchart illustrates a process implemented by the switching element 102 when the switching element 102 is started up. The process begins at step 1100 by starting the switching element 102. At step 1102, software is loaded and executed. At step 1104, a determination is made as to whether the information required to contact the network data server 112 is present. In contacting the network data server 112, the switching element 102 may use a network data server network ID. This ID, may be, for example, a transmission control protocol/internet protocol (TCP/IP) socket identifier stored as a universal resource locator (URL). Alternatively, a node ID may be used to contact the network data server. At step 1106, if the information is present, the start up process continues. At step 1108, after the start up process has finished, the switching element proceeds into normal operation with the process terminating thereafter. During process setup, available hardware functions are determined along with the node ID for the switching element.

With reference to step 1104, if the information, which is required to contact the network data server 112, is not present, then at step 1110, the operator is signaled that information is required. At step 1112, the switching element receives the information required to contact the network data server 112 with the process then proceeding to step 1106 as described above.

Figure 12:
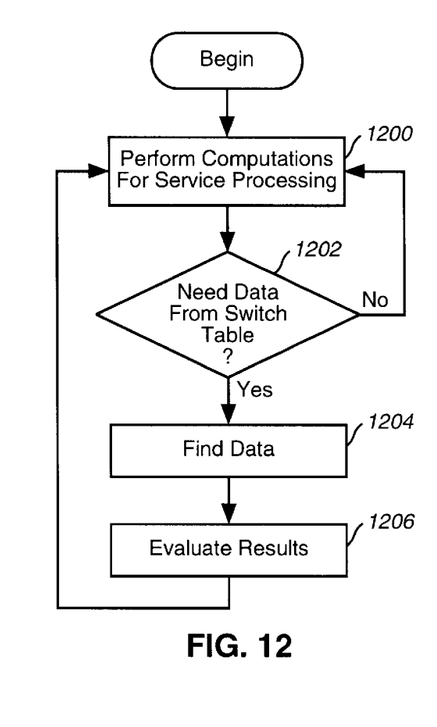
FIG. 12 is a flowchart of a process used by a switching element for processing and routing calls.

With reference now to FIG. 12, a flowchart of a process used by the switching element 102 for processing and routing calls is depicted. The process begins at step 1200 by performing computations for service processing. The steps performed in these computations include, for example, identifying a node or other switching element 102 to which a call is to be routed in response to receiving a call. In performing computations for service processing, a determination is made at step 1202 as to whether data is needed from the switch table. This switch table is the local switch table. If data is not needed, the process returns to step 1200 for continued processing of the call. Otherwise, at step 1204, the process finds the needed data and at step 1206, the results of the data returned are evaluated.

In evaluating results, a determination is made as to whether the results returned from finding the data may be used. For example, a determination is made as to whether the data is valid or whether no data was returned from the search of the switch table. In addition, the data returned may be invalid because the data is no longer valid based on an examination of a time stamped associated with the data.

Figure 13:
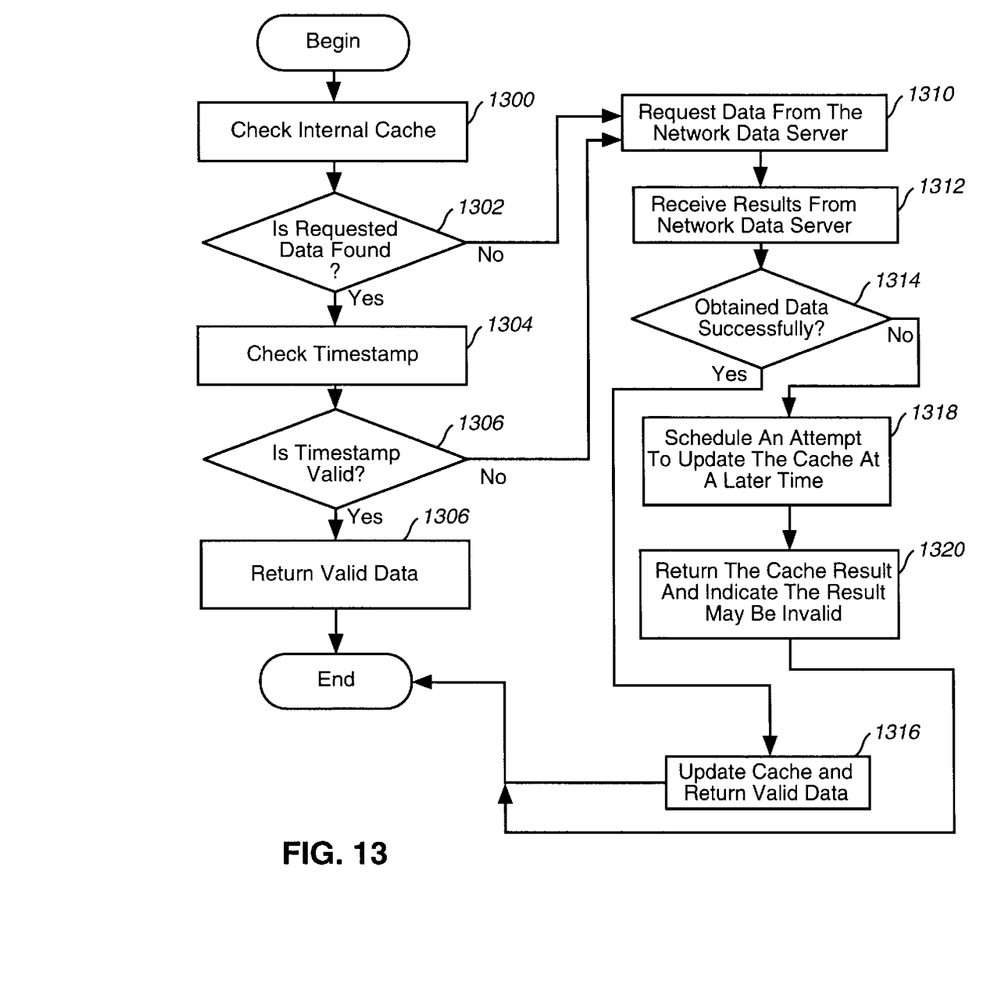
FIG. 13 is a flowchart of a process for finding data.

With reference now to FIG. 13, a flowchart of a process for finding data is depicted. The processes illustrated in FIG. 13 are a more detailed illustration of step 1204 in FIG. 12. At step 1300, the process begins by checking the local switch table located in the internal cache. At step 1302, a determination is made as to whether the requested data is found in the local switch table in the internal cache. If the data is found, then at step 1304, a time stamp associated with the returned data is checked. At step 1306, a determination is made as to whether the time stamp is valid. If the time stamp is valid, then at step 1308, the data is returned for use with the process terminating thereafter.

With reference again to step 1306, if the time stamp is not valid, then at step 1310, data is requested from the network data server 112. At step 1312, a result is then received from the network data server 112. At step 1314, a determination is made as to whether the requested data has been successfully received in the result returned from the network data server 112. If the data has been successfully obtained, then at step 1316, the table in the internal cache is updated and the data is returned to the process for use in routing the call with the process terminating thereafter. Otherwise, at step 1318, an update to the table in the internal cache is scheduled for a later time. At step 1320, the cache result is returned and an indication is made that the results may be invalid with the process terminating thereafter.

With reference again to step 1302, if the requested data is not found, the process also proceeds to step 1310 to request the data from the network data server 112.

Figure 14:
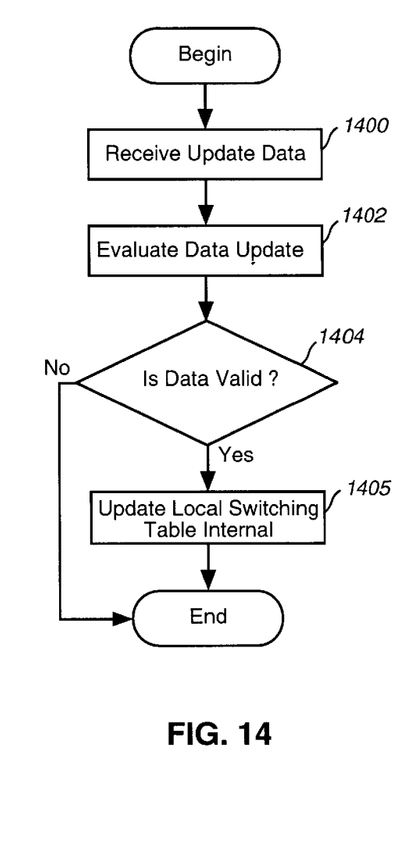
FIG. 14 is a flowchart of a process implemented in a switching element to receive an update.

With reference now to FIG. 14, a flowchart of a process implemented in the switching element 102 to receive an update is depicted. This process is used by the switching element 102 to receive updated information from the network data server 112 to provide current data used in routing calls. At step 1400, the process begins by receiving updated data. Then, at step 1402, the updated data is validated. This validation may be performed in a number of different ways depending on the implementation. At step 1404, a determination will be made as to whether the table is valid, whether the key is valid, and whether the time stamp is valid. At step 1406, validated and updated data is stored in the local table with the process terminating thereafter.

It is important to note, that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention the practical application and to enable others of ordinary skill in the art to understand the invention for various embodiments with various modifications as are suited to the particular use contemplated. While the invention has been particularly shown and described with reference to a preferred embodiment, it will be understood by those skilled in the art that various changes in form and detail may be made therein without departing from the spirit and scope of the invention.

What is claimed is:

1. A communications system comprising:
    a plurality of switching elements, wherein a switching element within the plurality of switching elements has a plurality of modes of operation including:
        a first mode of operation in which the switching element receives a call for routing;
        a second mode of operation, responsive to receiving the call, in which the switching element determines whether data is needed to route the call;
        a third mode of operation, responsive to determining that data is needed to route the call, in which the switching element searches a local data structure for the data;
        a fourth mode of operation, responsive to an absence of the data needed to route the call being located in the local data structure, in which the switching element requests the data needed to route the call; and
        a fifth mode of operation, responsive to the switching element receiving the data needed to route the call, in which the switching element stores the data needed to route the call in the local data structure; and
    a server computer associated with a global data structure and configured to:
        receive the request from the switching element,
        retrieve the data needed to route the call from the global data structure in response to receiving the request,
        transmit the data needed to route the call to the switching element,
        associate the data needed to route the call in the global data structure with the switching element, and
        transmit updates to the data needed to route the call in the global data structure to the switching element,
    wherein, when associating the data needed to route the call in the global data structure with the switching element, the server computer is configured to:
        store the data needed to route the call and information identifying the switching element in a database.
2. The communications system of claim 1, wherein each switching element includes a sixth mode of operation, responsive to receiving the data needed to route the call, in which the data is used to route the call.
3. The communications system of claim 1, wherein the server computer includes a centralized table.
4. The communications system of claim 3, wherein the server computer has a plurality of modes of operation including:
    a first mode of operation in which the server computer waits for requests from the plurality of switching elements;
    a second mode of operation, responsive to a request for data from a second switching element from within the plurality of switching elements, in which the server computer retrieves data corresponding to the request from the centralized table; and
    a third mode of operation, responsive to retrieval of the data, in which the server computer returns the requested data to the switching element.
5. A communications system comprising:
    a plurality of switching elements, wherein a switching element within the plurality of switching elements has a plurality of modes of operation including:
        a first mode of operation in which the switching element receives a call for routing;
        a second mode of operation, responsive to receiving the call, in which the switching element determines whether data is needed to route the call;
        a third mode of operation, responsive to determining that data is needed to route the call, in which the switching element searches a local data structure for the data;
        a fourth mode of operation, responsive to an absence of the data needed to route the call being located in the local data structure, in which the switching element requests the data needed to route the call; and
        a fifth mode of operation, responsive to the switching element receiving the data needed to route the call, in which the switching element stores the data needed to route the call in the local data structure; and
    a server computer associated with a global data structure and configured to:
        receive the request from the switching element,
        retrieve the data needed to route the call from the global data structure in response to receiving the request,
        transmit the data needed to route the call to the switching element,
        associate the data needed to route the call in the global data structure with the switching element, and
        transmit updates to the data needed to route the call in the global data structure to the switching element,
    wherein the switching element is further configured to:
        determine whether a time stamp associated with the data is valid when the data is in the local data structure, and
        request the data from the server computer when the time stamp is determined to be invalid.

* * * * *